US006973992B2

(12) United States Patent
Yoneda et al.

(10) Patent No.: US 6,973,992 B2
(45) Date of Patent: Dec. 13, 2005

(54) ELECTRIC POWER STEERING APPARATUS

(75) Inventors: Atsuhiko Yoneda, Wako (JP); Yasuo Shimizu, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 10/841,922

(22) Filed: May 7, 2004

(65) Prior Publication Data

US 2004/0222035 A1 Nov. 11, 2004

(30) Foreign Application Priority Data

May 7, 2003 (JP) ............................ 2003-129427

(51) Int. Cl.[7] ................................................ B62D 5/04
(52) U.S. Cl. ......................... 180/446; 701/42; 318/293
(58) Field of Search ............................... 180/443, 446; 701/41, 42; 318/293

(56) References Cited

U.S. PATENT DOCUMENTS 4,719,396 A * 1/1988 Shimizu ..................... 318/293
4,875,539 A * 10/1989 Abukawa et al. ........... 180/446
6,691,818 B2 * 2/2004 Endo et al. ................. 180/446
6,885,225 B2 * 4/2005 Ohmichi et al. ............ 327/112
2003/0156439 A1 * 8/2003 Ohmichi et al. .............. 363/98

FOREIGN PATENT DOCUMENTS

JP 2864474 12/1998

* cited by examiner

*Primary Examiner*—Matthew Luby
(74) *Attorney, Agent, or Firm*—Hamre, Schumann, Mueller & Larson, P.C.

(57) ABSTRACT

An elect power steering apparatus includes a motor drive circuit for PWM-driving an electric motor to generate a steering assist torque corresponding to a steering torque. The motor drive circuit includes a bridge circuit formed by a plurality of FETs, and a predrive circuit for driving FETs at a positive potential. Series connected first and second voltage step-up circuits for stepping up a line voltage at two stages are provided in front of the predrive circuit so that the FETs are driven by the predrive circuit with an output voltage from the second voltage step-up circuit supplied to the predrive circuit.

3 Claims, 11 Drawing Sheets

10
11
20d
21
22
12
A
V
CONTROL UNIT
T
20
SG1
SG2
18
23
17
16
14a
24
14
13
19
15

III
III
ACG
BATT
10
12
14
16
16
18
19
20
20d
22
24
31
32
32
33
34
34
35
36
37
38
38
39
39

12
20
20a
20b
22
19
50
43
44
49
IV
IV
24a
48
47
24
46
18
41
15
45
13
14
42
14a

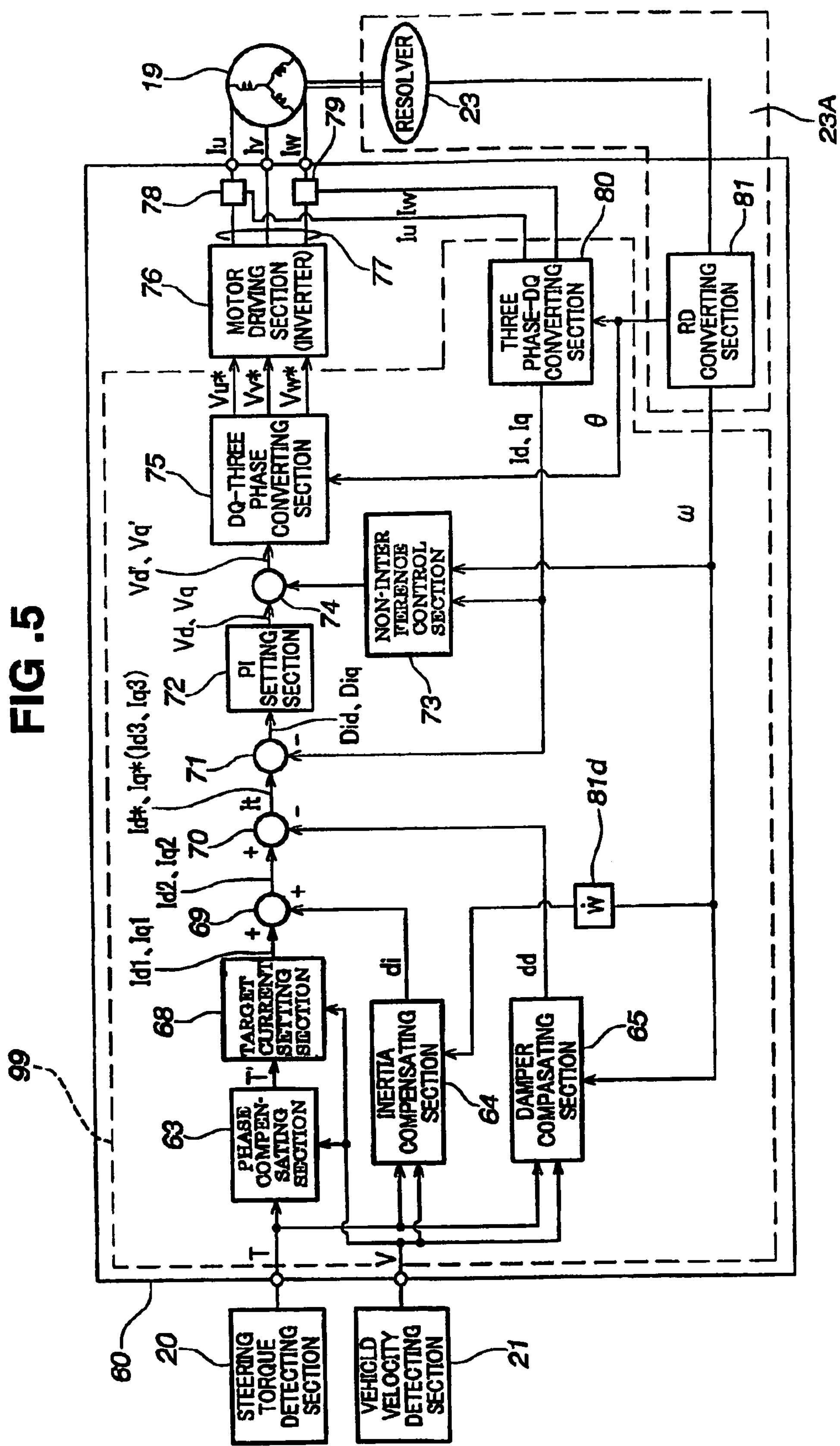
FIG .5
99
60
20
STEERING TORQUE DETECTING SECTION
21
VEHICLD VELOCITY DETECTING SECTION
T
V
63
PHASE COMPEN-SATING SECTION
T'
68
TARGET CURRENT SETTING SECTION
64
INERTIA COMPENSATING SECTION
65
DAMPER COMPASATING SECTION
di
dd
Id1, Iq1
69
Id2, Iq2
70
It
Id*, Iq*(Id3, Iq3)
71
Did, Diq
72
PI SETTING SECTION
Vd, Vq
74
Vd', Vq'
73
NON-INTER FERENCE CONTROL SECTION
75
DQ-THREE PHASE CONVERTING SECTION
Vu*
Vv*
Vw*
76
MOTOR DRIVING SECTION (INVERTER)
77
78
79
Iu
Iv
Iw
Iu Iw
19
RESOLVER
23
23A
80
THREE PHASE-DQ CONVERTING SECTION
81
RD CONVERTING SECTION
Id, Iq
θ
ω
81d
Ẇ

BATT
36
35
IGSW
ACG
37
19
U
V
W
23
RESOLVER
Iu
Iv
Iw
PG
CURRENT SENSOR
78
CURRENT SENSOR
79
76
W
V
U
95e
95f
95c
95d
95a
95b
95
FIRST VOLTAGE STEP-UP CIRCUIT
82
SECOND VOLTAGE STEP-UP CIRCUIT
83
128
PWM
PWM
PREDRIVE CIRCUIT
REGULATOR
99
MICROCOMPUTER
I/F
125
84
RD CONVERTER
81
I/F
126
123
I/F
131
71
72
60
STEERING TORQUE DETECTING SECTION
20
VEHICLE VELOCITY DETECTING SECTION
21

STEERING TORQUE DETECTING SECTION
VEHICLD VELOCITY DETECTING SECTION
MICROCOMPUTER
REGULATOR
VOLTAGE STEP-UP CIRCUIT
PREDRIVE CIRCUIT
I/F
RD CONVERTER
CURRENT SENSOR
RESOLVER
ACG
BATT
IGSW
PWM
U
V
W
PG
20
21
60
123
132
131
133
81
126
99
125
84
97
82
128
76'
95
90
35
37
36
19
23
78
79

129
BATT
ACG
IGSW
101
102
RESOLVER
U
V
W
Iu
Iv
Iw
PQ
CURRENT SENSOR
118
CURRENT SENSOR
119
W
U
150
PWM
PWM
116
VOLTAGE STEP-UP CIRCUIT
130
128
PREDRIVE CIRCUIT
140
REGULATOR
I/F
125
122
MICROCOMPUTER
RD CONVERTER
I/F
100
123
I/F
131
132
133
127
126
STEERING TORQUE DETECTING SECTION
106
VEHICLD VELOCITY DETECTING SECTION
107
ENGINE SPEED DETECTING SECTION
124

ELECTRIC POWER STEERING APPARATUS

FIELD OF THE INVENTION

The present invention relates to an electric power steering apparatus which performs a steering assist operation by applying a torque generated by an electric motor to a vehicle steering system.

BACKGROUND OF THE INVENTION

Electric power steering apparatuses are conventionally known, which comprises a power steering unit driven by an electric motor, and a control unit including a microcomputer and a motor drive circuit. In operation, a steering torque generated when the steering wheel is turned and a vehicle velocity are detected and, based on signals corresponding to the detected steering torque and vehicle velocity, the control unit performs PWM (pulse-width modulation)-drive control of the electric motor to generate a steering assist power to thereby reduce the necessary steering power to be applied by the driver.

The motor drive circuit includes an FET (field-effect transistor) bridge circuit and a predrive circuit for applying a drive signal voltage to gates of FETs of the FET bridge circuit. The motor drive circuit performs drive control of the electric motor in accordance with a PWM drive signal supplied from the microcomputer.

In the FET bridge circuit, drains of those FETs at a positive potential are connected to a power supply or source, sources of those FETs at a negative potential are grounded, and sources of the FETs at the positive potential and drains of the FETs at the negative potential are connected together to form output terminals to which the electric motor is connected. The FETs at the positive potential are driven via a voltage step-up circuit (generally called as "booster converter" or "step-up converter") so that a smooth steering feel can be obtained. One example of such known electric power steering apparatus is disclosed in Japanese Patent No. 2,864,474.

FIG. 9 shows a circuit diagram of a motor controller incorporated in another conventional electric power steering apparatus. The motor controller 100 includes an interface circuit 123 having an analog to digital (A/D) converter that converts analog signals (including a steering torque signal from a steering torque detecting section 106, a vehicle velocity signal from a vehicle velocity detecting section 107 and an engine speed (r.p.m.) signal from an engine speed detecting section 124) into digital signals. The digital signals are supplied from the interface circuit 123 to a microcomputer 122.

Another interface circuit 125 converts drive currents detected by motor current sensors 118, 119 into digital signals and delivers the digital signals to the microcomputer 122. Still another interface circuit 126 delivers an exciting current from an RD (resolver digital) converter 127 to a resolver 102 and also delivers an output signal from the resolver 102 to the RD converter 127. The RD converter 127 generates, on the basis of the output signal from the resolver 102, a rotational angle signal indicative of the rotational position of a rotor of an electric motor (three phase brushless motor) 101 and supplies the rotational angle signal to the microcomputer 122. A motor drive circuit 116 is composed of a predrive section 140 and an inverter circuit 150 having six power FETs. The predrive section 140 includes a predrive circuit 128 for supplying a drive signal to FETs at a positive potential of the inverter circuit 150, and a voltage step circuit 130 that steps up a line voltage of a power supply battery) 129, for example, from 12-volts to 24-volts before the line voltage is supplied to the predrive circuit 128.

The microcomputer 122 is connected with a crystal oscillator 131 and capacitors 132, 133 that are provided externally of the microcomputer 122 so that in the microcomputer 122 an oscillating frequency of the crystal oscillator 131 is divided to generate a frequency of PWM signal (PWM frequency) that is used to for driving the brushless motor 101.

The crystal oscillator 131 and the capacitors 132, 133 are also connected to the RD converter 127 so that in the RD converter 127, the oscillating frequency of the crystal oscillator 131 is divided to generate a frequency of an exciting signal (exiting frequency) that is used for driving the resolver 102.

With the motor controller 100 thus constructed, since the FETs at a positive potential of the inverter circuit 150 are driven by the motor drive circuit 118 via the voltage step-up circuit 130 of the predrive section 140, a smooth steering tough or feel can be obtained.

However, when another in-vehicle device or unit is in motion or when the battery 129 undergoes degradation, driving of the motor 101 of the power steering apparatus will involve an additional quantity of current drawn from the battery 129, causing the line voltage of the motor vehicle to drop abruptly. In this instance, due to such abrupt drop in the line voltage (i.e., the voltage level of the battery 129 to the motor controller 100), the voltage appearing after the voltage step-up circuit 130 also dips below the normal. As a consequence, an FET gate drive signal delivered from the predrive circuit 128 involves a voltage drop, which increases ON-resistance of the FETs, tending to fluctuate the motor drive voltage. This causes the motor output to fluctuate, resulting in deterioration of the steering wheel Furthermore, since the FM with increased ON-resistance will generate heat upon conduction, the ON-resistance becomes higher, making it more difficult to obtain a smooth steering feel.

The foregoing problems will be discussed in further detail with reference to FIGS. 10–13. FIG. 10 is a graph showing the relationship between the terminal voltage of the battery (power source) and the discharge current of the battery. In the graph, a curve designated by A1 represents a terminal voltage versus discharge current characteristic curve obtained when a battery is in the initial state and hence degradation of the battery does not occur, while a curve designated by A2 represents a terminal voltage versus discharge current characteristic curve obtained when a battery is in a degraded condition.

As appears clear from the curve A1, the terminal voltages decreases as the discharge current increases. From this, it will be readily understood that when another in-vehicle device or unit is driven while the electric power steering device is operating, the discharge current increases and the terminal voltage decreases conversely. In the case where a 12V battery is used as a power source, the terminal voltage normally varies in a range of from 10V to 12V. However, when an abrupt voltage drop occurs due to driving of another in-vehicle device during operation of the electric power steering apparatus, the terminal voltage may drop to 8V or so. As is evident from the curve A2, when the battery undergoes degradation, the terminal voltage drops steeper than that of the non-degraded battery (e., the battery in the initial state represented by the curve A1) as the discharge curt increases.

FIG. 11 shows the structure of an FET used in an FET bridge circuit such as the inverter circuit 150 shown in FIG.

9. As shown in this figure, the FET has a source terminal S, a drain terminal D and a gate terminal G. In FIG. 11, the drain-source voltage, gate-source voltage and drain current are denoted by $V_{DS}$, $V_{GS}$ and $I_D$, respectively. The gate-source voltage will be hereinafter referred to as "gate voltage".

FIG. 12 is a graph showing current versus voltage characteristic curves of the FET shown in FIG. 11, which are plotted under the condition that $T_d$=25° C. where $T_J$ is the junction temperature. In the graph, the horizontal axis represents the drain source voltage $V_{DS}$ and the vertical axis represents the drain current ID. Furthermore, curves designated by B1, B2, B3, B4, B5 and B6 represent current versus voltage characteristics obtained when the gate voltage $V_{GS}$ is 10V, 9V, 8V, 7V, 6V and 5V, respectively. As is apparent from FIG. 12, gradients of the respective current versus voltage characteristic curves B1, B2, B3, B4, B5 and B6 become small as the gate voltage $V_{GS}$ decreases. That is, ON-resistance (internal resistance) of the FET increases with a decrease in gate voltage $V_{GS}$, and the gate voltage $V_{GS}$ decreases with the drain current $I_D$. Furthermore, for the gate voltage $V_{GS}$ of 5V, the drain current ID does not reach a value of 80A, which is necessary for driving the motor of the electric power steering apparatus, even when the source-drain voltage $V_{SD}$ is increased.

It appears clear from FIG. 12 that in order to obtain the necessary motor-driving drain current ($I_D$=80A), the gate voltage $V_{GS}$ must be 6V or higher. For the gate voltage $V_{GS}$=10V, the necessary motor-driving drain current ($I_D$=80A) can be obtained when the drain-source voltage $V_{DS}$ is 0.6V. Similarly, for the gate voltage $V_{GS}$=6V, the necessary motor-driving drain current ($I_D$=80A) is obtained when $V_{DS}$ is 1.5V. This means that the motor drive voltage decreases with the result that the steering feel is deteriorated To deal with this problem, it has been a general practice that a voltage Step-up circuit increases the line voltage so that the FETs are driven by a gate drive signal with sufficiently high voltage value. As previously discussed, the conventional motor controller having such voltage step-up circuit still encounters a problem when another in-vehicle device or apparatus is driven while the electric power steering apparatus is in motion.

FIG. 13 is a graph showing the temperature-dependent characteristic of the FET ON-resistance observed under the condition that $V_{GS}$=6V and $I_D$=37.5A. As is apparent from FIG. 13, the ON-resistance of FETs increases with an increase in temperature.

It will be appreciated from FIGS. 10–13 that as the gate voltage $V_{GS}$ decreases, the ON-resistance of the FETs increases. An attempt to control the current at a constant value will increase Joule heat produced in each FET (as represented by $Q=I^2Rt$). The temperature of the FET is thus increased, and the ON-resistance of the FET increases as previously discussed with reference to FIG. 13. With an increase in ON-resistance, the current flowing in the FET decreases with the result that the motor current is reduced In this instance, since feedback control is performed to keep the motor current constant, the duty ratio is increased to make the motor current equal a target current. This process is, however, accompanied by further generation of Joule heat and a further increase of ON-resistance. Consequently, the motor output is caused to slightly vibrate or fluctuate about a given value with the result that the steering feel is deteriorated.

SUMMARY OF THE INVENTION

It is accordingly an object of the present invention to provide an electric power steering apparatus, which is capable of producing steering assist power without involving objectionable fluctuations in the motor output even when line voltage variations occur, thereby providing a smooth steering feel.

To achieve the foregoing object, according to a first aspect of the present invention, there is provided an electric power steering apparatus comprising a motor drive circuit for PWM-driving an electric motor to generate a steering assist torque corresponding to a steering torque. The motor drive circuit includes a bridge circuit formed by a plurality of active elements connected together, a first voltage step-up circuit for stepping up a line voltage of the electric power steering apparatus, a second voltage step-up circuit connected in series with the first voltage for stepping up an output voltage from the first voltage step-up circuit, and a predrive circuit connected in series with the bridge circuit and the second voltage step-up circuit for driving active elements at a positive potential of the active elements with an output voltage from the second voltage step-up circuit supplied to the predrive circuit.

With the electric power steering apparatus thus arranged, the line voltage, which has been stepped up by the first voltage step-up circuit, is further stepped up by the second voltage step-up circuit before it is supplied to the predrive circuit. Accordingly, even when an abrupt line voltage drop occurs due to degradation of a battery (power supply) or driving of the electric motor of the electric power steering apparatus while another in-vehicle device or unit is in motion, the voltage supplied to the predrive circuit is still higher than the line voltage. Thus, the gate drive signal has a voltage level, which is high enough to drive the active elements such as FETs without involving an increase in ON-resistance of the active elements. As a consequence, output of the electric motor is free from fluctuations, and a smooth steering touch or feel can be obtained.

According to a second aspect of the present invention, there is provided an electric power steering apparatus comprising a motor drive circuit for PWM-driving an electric motor to generate a steering assist torque corresponding to a steering torque. The motor drive circuit includes a bridge circuit formed by a plurality of active elements connected together, a predrive cacti connected with the bridge circuit for driving active elements at a positive potential of the active elements, a first power supply for supplying a line voltage to the bridge circuit, and a second power supply provided separately from the first power supply for exclusive use with the predrive circuit for supplying a second voltage solely to the predrive circuit.

By virtue of the second power supply provided separately from the first power supply Line voltage source) for exclusive use with the predrive circuit, the second voltage supplied from the second power supply to the predrive circuit is independent from line voltage variations which may occur when the first power supply (battery) undergoes degradation or when the electric motor of the electric power steering apparatus is driven while another in-vehicle device or unit is in motion. Thus, the gate drive signal has a voltage level, which is high and stable enough to drive the active elements such as FETs without involving an increase in ON-resistance of the active elements. Accordingly, output of the electric motor is free from fluctuations, and a smooth steering touch or feel can be obtained.

The motor drive circuit may further include a voltage step-up circuit disposed between the second power supply and the predrive circuit for stepping up the second voltage from the second power supply before the second voltage is supplied to the predrive circuit.

BRIEF DESCRIPTION OF THE DRAWINGS

Preferred embodiments of the present invention will hereinafter be described in detail, by way of example only, with reference to the accompanying drawings, in which:

FIG. 5 is a block diagram showing an electric circuitry of a motor controller of the electric power steering apparatus;

DETAILED DESCRIPTION OF THE PREFERRED EMBODIMENT

Figure 1:
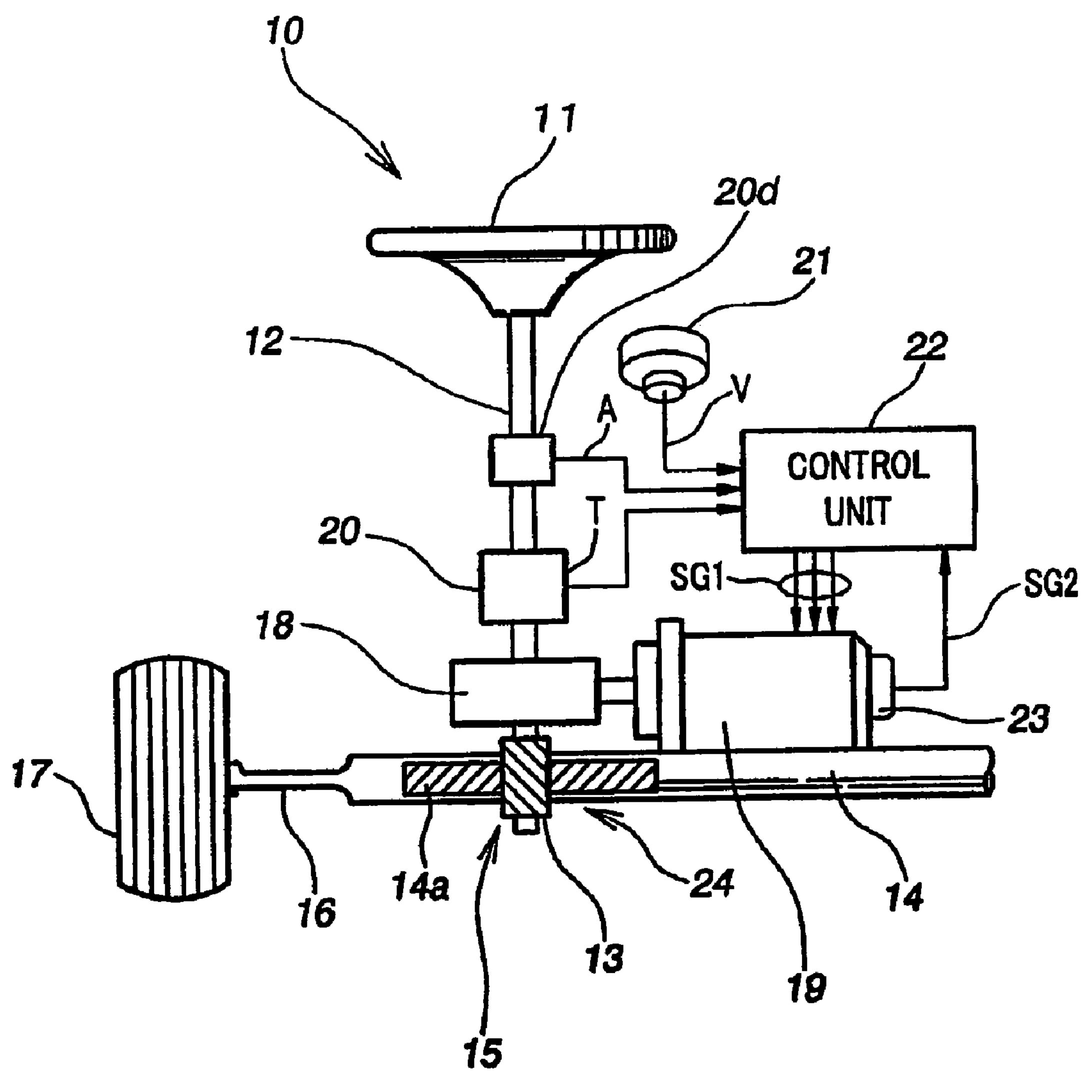
FIG. 1 is a diagrammatical view showing the general arrangement of an electric power steering apparatus according to the present invention.

Referring now to the drawings and FIG. 1 in particular, there is shown the general arrangement of an electric power steering apparatus 10 embodying the present invention. The electric power steering apparatus 10 is incorporated in a passenger car, for example, and so constructed as to apply steering assist power (assist steering torque) to a steering shaft 12, for example, connected to a sag wheel 11. The steering wheel 11 is connected to an upper end of the steering shaft 12, and a lower end of the steering shaft 12 has a pinion gear 13 mounted thereon. The pinion gear 13 is in mesh with a rack gear 14*a* formed on a rack shaft 14. The pinion gear 13 and the rack gear 14*a* together form a rack-and-pinion mechanism 16. The rack shaft 14 is connected at opposite ends (one end being shown) with tie rods 16 each of which is connected at an outer end with one front wheel 17. The steering wheel 12 is also connected via a power transmission mechanism 18 to a brushless motor 19. The brushless motor 19 operates to generate rotational power (torque), which in turn is applied via the power transmission mechanism 18 to the steering shaft 12 as steering assist power.

The electric power steering apparatus 10 also includes a steering torque detecting section or unit 20 associated with the steering shaft 12 for detecting a steering torque applied to the steering shaft 12 when the driver turns the steering wheel 11 to undertake a steering operation, a steering angle detecting sensor 20*d* associated with the steering shaft 12 for detecting a steering angle, a vehicle velocity detecting section or unit 21 for detecting a velocity of the vehicle, and a control unit or controller 22 basically formed by a microcomputer. The controller 22 is supplied with a steering torque signal T from the steering torque detecting unit 20, a steering angle signal A from the steering angle sensor 20*d* and a vehicle velocity signal V from the vehicle velocity detecting unit 21 and generates, on the basis of steering-torque-related information, steering-angle-related information and vehicle-velocity-related information, a drive control signal SG1 for controlling rotating operation of the brushless motor 19. The brushless motor 19 is associated with a motor rotational angle detecting section or unit 23, such as a resolver. A rotational angle signal SG2 output from the motor rotational angle detecting unit 23 is fed back to the controller 22. The rack-and-pinion mechanism 15 is housed in a gearbox 24 (FIG. 2).

The electric power steering apparatus 10 of the foregoing construction can be formed by modifying the structure of a conventional steering system to further include the aforesaid steering torque detecting unit 20, steering angle sensor 20*d*, vehicle velocity detecting unit 21, controller 22, brushless motor 19 and power transmission mechanism 18.

With the foregoing arrangement of the electric power steering apparatus 10, when the driver turns the steering wheel 11 to change the direction of travel of the motor vehicle while running, a rotary motion of the steering shaft 12 caused by a steering torque applied thereto is converted by the rack-and-pinion mechanism 14 into a linear reciprocating motion of the rack shaft 14 to thereby change the travel direction of the front wheels 17 via the tie rods 16. In this instance, the steering torque detecting unit 20 associated with the steering shaft 12 detects a steering torque corresponding to a muscular effort or force applied by the driver to the steering wheel 11, converts the detected steering torque into an electric steering torque signal T and sends the steering torque signal T to the controller 22. At the same time, the steering angle sensor 20*d* detect a steering angle and outputs a steering angle signal A to the controlled Similarly, the vehicle velocity detecting unit 21 detects a velocity of the vehicle, converts the detected vehicle velocity into an electric vehicle velocity signal V and sends the vehicle velocity signal V to the controller 22. The controller 22 generates a motor current (Iu, Iv, Iw) for driving the brushless motor 19 on the basis of the steering torque signal T, the steering angle signal A and the vehicle velocity signal V. The brushless motor 19 driven with the motor current applies steering assist power to the steering shaft 12 via the power transmission mechanism 18. By thus driving the brushless motor 19, necessary steering power to be applied by the driver to the steering wheel 11 can be reduced.

Figure 2:
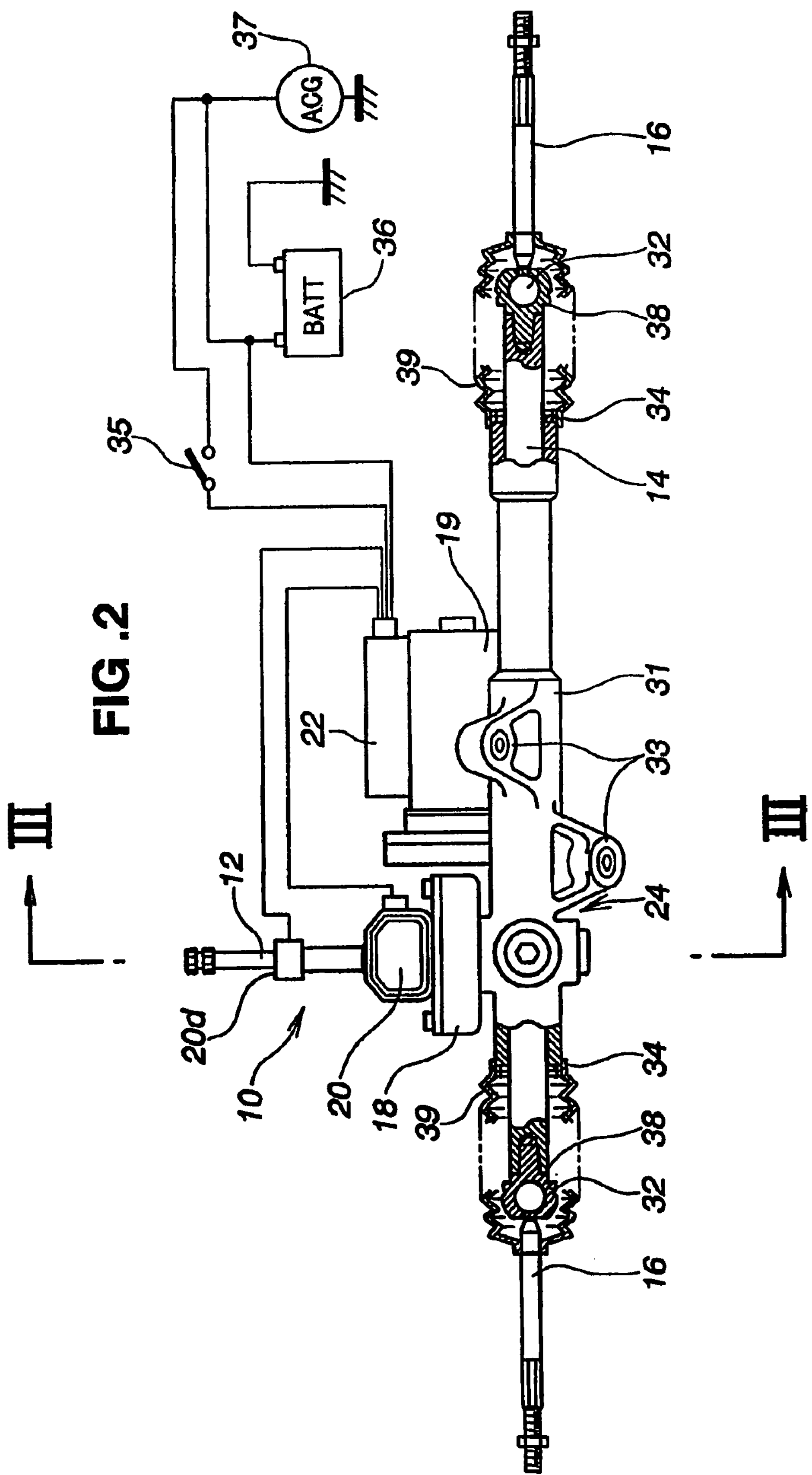
FIG. 2 is a diagrammatical view showing the connection between a main part of a mechanical system and an electric system of the electric power steering apparatus.

FIG. 2 schematically illustrates the connection between a main part of a mechanical system and an electric system of the electric power steering apparatus 10, with left and right end portions of the rack shaft 14 shown in cross section for clarity. The rack shaft 14 is slidably received in a tubular housing 31 such that the rack shaft 14 is movable in the axial direction thereof. Opposite ends of the rack shaft 14 project outward from the housing 18, and ball joints 32 are screwed to the opposite ends of the rack shaft 14. The left and right tie rods 16 are connected to the ball joints 32, respectively. The housing 31 has a plurality of brackets 33 adapted to be attached to a body (not shown) of the motor vehicle, and stoppers 34, 34 formed at opposite ends thereof for a purpose described below.

As shown in FIG. 2, the electric system includes an ignition switch 35, an onboard battery (power supply) 36 and an ac current generator or dynamo 37 associated with an engine (not shown) of the motor vehicle. The dynamo 37 starts to generate electric power when the engine is started. The controller 22 is supplied with necessary electric power from the battery 36 or the dynamo 37. The controller 22 is associated with the brushless motor 19. Reference numeral 38 shown in FIG. 2 denotes a rack end engageable with a corresponding one of the stoppers 34 to limit further axial movement of the rack shaft 14 in one direction. Reference numeral 39 denotes a rubber boot provided at each end of the tubular housing 31 for protecting the interior of the gearbox 24 from getting a foreign matter, such as water, mud or dust.

Figure 3:
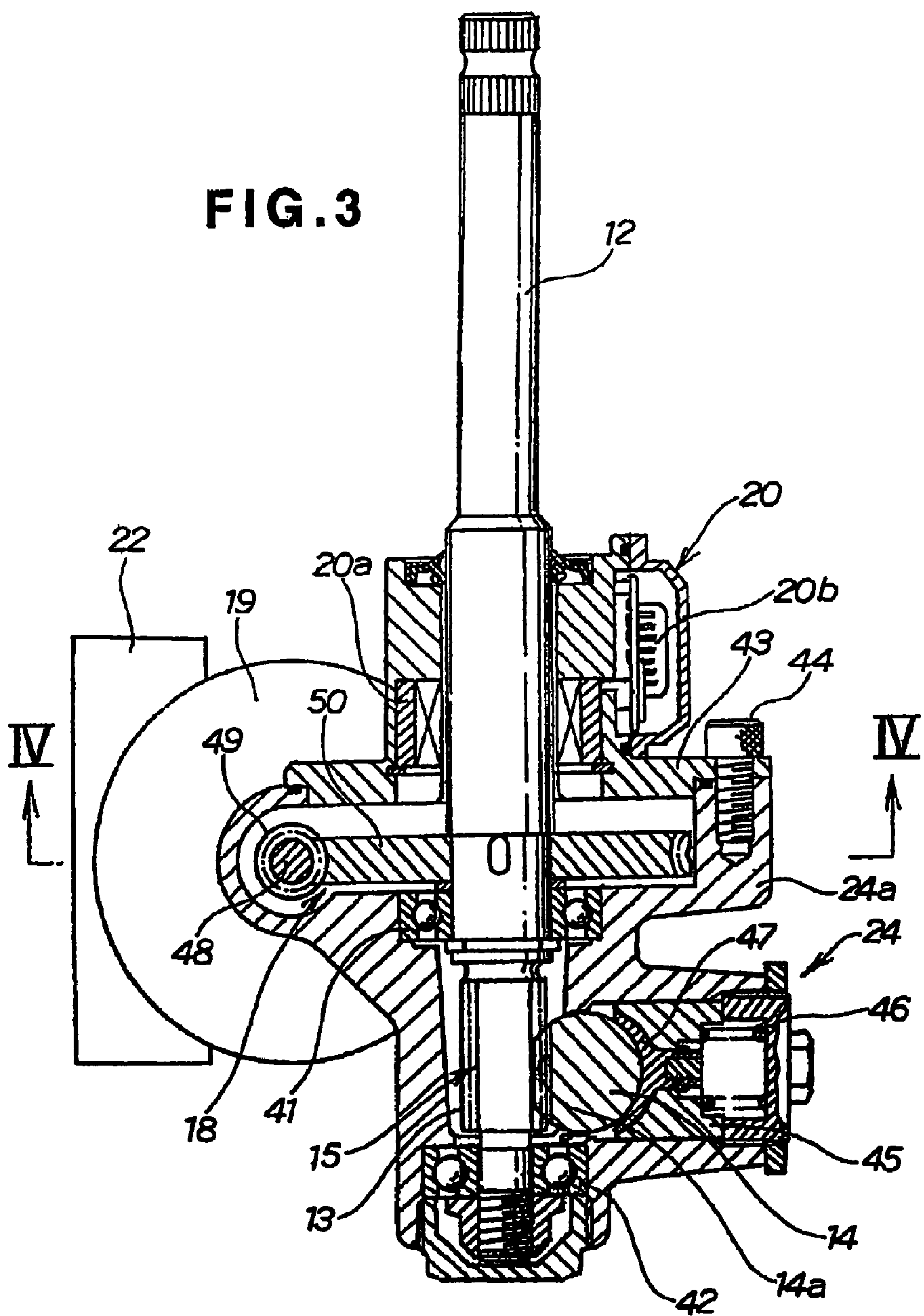
FIG. 3 is a cross-sectional view taken along line III—III of FIG. 2.

FIG. 3 shows in cross section structural details of a support mechanism for the steering shaft 12, steering torque sensor 20, power transmission mechanism 18 and rack-and-pinion mechanism 15 together with an arrangement of the brushless motor 19 and the controller 22.

As shown in FIG. 3, the gearbox 24 is formed by a part 24*a* of the housing 24, and the steering shaft 12 is rotatably supported by a pair of ball bearings 41 and 42 within the housing part 24*a*. The housing part 24*a* accommodates within it the rack and pinion mechanism 15 and the power transmission mechanism 18. The housing part 24*a* has an opening at an upper end thereof, which is closed by a lid 43 attached by bolts 44 (one being shown) to the housing part 24*a*. The steering torque detecting unit 20 is assembled with an upper part of the lid 43. The pinion 15 formed on a lower end portion of the steering shaft 12 is located between the ball bearings 41, 42. The rack shaft 14 is guided by a rack guide 45 and forced toward the pinion 13 by a backing member 47, which is urged by the force of a compression coil spring 46. The power transmission mechanism 18 is composed of a worm gear 49 fixedly mounted on a power transmission shaft 48 and a worm wheel 50 fixedly mounted on the steering shaft 12. The power transmission shaft 48 is coupled with an output shaft of the brushless motor 19. The steering torque detecting unit 20 is composed of a steering torque sensor 20*a* disposed around the steering shaft 12 and an electronic circuit 20*b* for electrically processing a detection signal output from the steering torque sensor 20*a*. The steering torque sensor 20*a* is attached to the lid 43.

Figure 4:
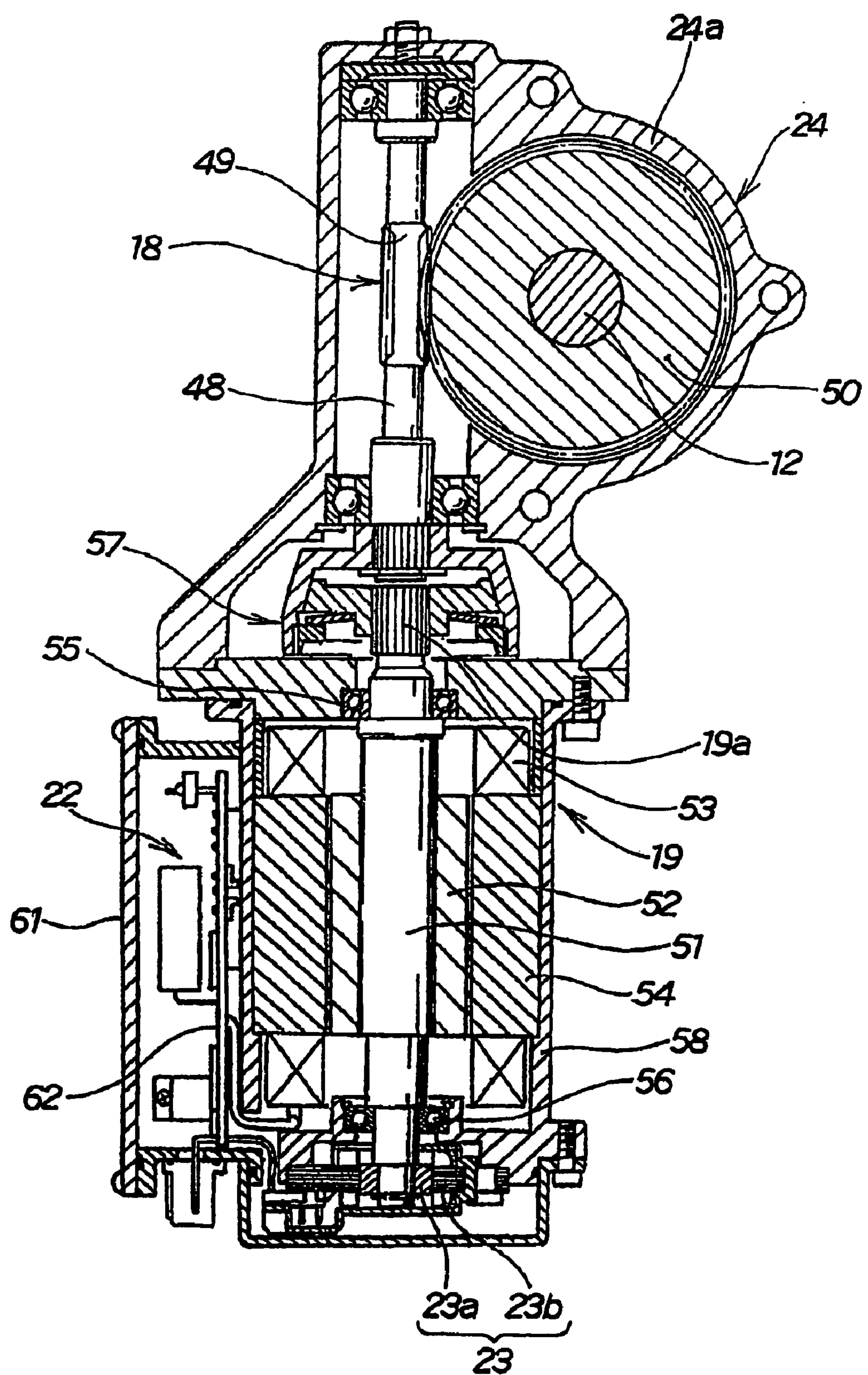
FIG. 4 is a cross-sectional view taken along line IV—IV of FIG. 3.

FIG. 4 is a cross-sectional view showing an internal structure of the brushless motor 19 and the controller 22. As shown in this figure, the brushless motor 19 has a rotor 52 of permanent magnet fixedly mounted on a rotating shaft 51 and a stator 54 disposed around the rotor 52. The stator 54 has a stator winding 53. The rotating shaft 51 is rotatably supported by a pair of ball bearings 55 and 56. The rotating shaft 51 has a fore-end (upper end in FIG. 4) forming an output shaft 19*a* of the brushless motor 19. The output shaft 19*a* of the brushless motor 19 is connected with the power transmission shaft 48 via a torque limiter 57 for transmission of rotational power from the brushless motor 19 to the power transmission shaft 48. The worm gear 49 is fixedly mounted to the power transmission shaft 48 and it is held in mesh with the worm wheel 50. The rotating shaft 61 has a rear end tower end in FIG. 4) on which the motor rotational angle detecting unit (position sensor) 23 is mounted for detecting a rotational angle (rotating position) of the rotor 52 of the brushless motor 19. The motor rotational angle detecting unit 23 includes a rotor 23*a* fixedly mounted on the rotating shaft 51, and a detecting element 23*b* that detects a rotational angle of the rotor 23*a* by using a magnetic action. One example of such motor rotational angle detecting unit 23 is a resolver, as mentioned above. The stator winding 53 of the stator 54 is supplied with a motor current Iu, Iv, Iw (FIG. 5) formed by three-phase alternating current. The foregoing parts or components of the brushless motor 19 are housed in a motor case 58.

The controller 22 is installed in a control box 61 mounted on an outer surface of the motor case 58. The controller 22 is formed by a microcomputer, as stated above, and includes a single circuit board 62 on which are mounted various electronic circuit components, such as a one-chip microprocessor (CPU) and its peripheral circuits, predrive circuit, FET (field-effect transistor) bridge circuit, inverter circuit and so on. The controller 22 supplies the stator winding 53 of the brushless motor 19 with the motor current (drive control signal SG1 shown in FIG. 1). The controller 22 is supplied with a rotational angle signal SG2 (FIG. 1) output from the motor rotational angle detecting unit 23 as representing a rotational angle of the rotating shaft 51.

The control unit 22 shown in FIGS. 1–4 includes a motor control section or controller for controlling rotation of the brushless motor 19. As shown in FIG. 5, the resolver 23 is coupled with the brushless motor 19 for detecting a rotational angle of the brushless motor 19. In FIG. 5, the steering angle sensor shown in FIGS. 1 and 2 is not illustrated for purposes of explanation.

The motor controller 60 includes a phase compensating section or compensator 63, an inertia compensating section or compensator 64 and a damper compensating section or compensator 65.

The phase compensator 63 serves to undertake a phase compensating operation based on a steering torque signal T from the steering torque detecting section 20 and a vehicle velocity signal V from the vehicle velocity detecting section 21 and delivers a compensated steering torque signal T, to a target current setting section or setter 68. The inertia compensator 64 generates an inertia compensation signal di for an inertia compensation process on the basis of the steering torque signal T, vehicle velocity signal V and an angular velocity that is obtained by differentiating a rotational angular speed ω at a differentiation processing section or differentiator 81*d* and delivers the inertia compensation signal di to an adder 69. The damper compensator 65 generates a damper compensation signal dd for a damper compensation process on the basis of the steering torque signal T, vehicle velocity signal V and rotational angular speed signal X and delivers the damper compensation signal dd to a subtractor 70.

The target current setter 68 computes two target currents with phase shift Id1 and Iq1 (Hereinafter referred to as "two-phase target currents") on the basis of the compensated steering torque signal T and the vehicle velocity signal V. In a rotational coordinate system, which is in synch synchronism with a rotating magnetic flux created by a permanent magnet on a rotor of the brushless motor 19, the target currents Id1 and Iq1 correspond to a d-axis in the same direction as a main magnetic flux and a q-axis perpendicular to the main flux direction, respectively. Accordingly, the target currents Id1 an Iq1 will be hereinafter referred to as "d-axis target current" and "q-axis target current", respectively.

Each of the target currents Id1 and Iq1 is then added with the inertia compensation signal di at the adder 69 which in tern delivers inertia-compensated target currents Id2 and Iq2 to the subtractor 70. A the subtractor 70, the inertia-compensated target currents Id2 and Iq2 are subtracted by the damper compensation signal dd, and damper-compensated target currents Iq3 and Iq3 are output from the subtractor 70. The damper compensated target currents Id3 and Iq3 will be referred to as "d-axis final target current Id*" and "q-axis final target current Iq*", respectively. The d-axis final target current Id* and q-axis final target current Iq* are supplied to a deviation calculation section or circuit 71.

At the deviation calculation circuit 71, d- and q-axis detection currents Id and Iq are subtracted from the corresponding final target currents Iq* and Id* to calculate deviations Did and Diq. The calculated deviations Did, Diq are then delivered to a PI setting section or setter 72.

The PI setter 72 performs arithmetic operation using the deviations Did, Diq to calculate a d-axis target voltage Vd and a q-axis target voltage Vq so that the d-axis detection current Id and the q-axis detection current Iq follow up the d-axis final target current Id* and the q-axis final target current Iq*, respectively. The d-axis target voltage Vd and the q-axis target voltage Vq are corrected into a corrected d-axis target voltage Vd' and a corrected q-axis target voltage Vq', respectively, through a compensation achieved by a combination of an non-interference control section or controller 73 and an arithmetic unit 74. The corrected d- and q-axis target voltages Vd'and Vq' are supplied to a dq three-phase converting section or converter 75.

In a description given above with reference to FIG. 5, the adder 69, subtractor 70, deviation calculation circuit 71, PI setter 72 and arithmetic unit 74 are described as constituting a single group of circuit elements provided for processing both the d-axis target current Id1 and the q-axis target current Iq1. This is only for purposes of illustration. In a practical motor controller, two such circuit element groups are provided each for processing a respective target current Id1, Iq1.

The noninterference controller 73, on the basis of the d- and q-axis detection currents Id and Iq and the angular velocity (of the rotor, calculates noninterference control corrections for determination of the d- and q-axis target voltages Vd and Vq.

The arithmetic unit 74 subtracts the noninterference control corrections from the d- and q-axis target voltages Vd and Vq, respectively, for determining the corrected d and q-axis target voltages Vd' and Vq' and delivers the corrected d- and q-axis target voltages Vd' and Vq' to the dq-three phase converter 75.

The dq three-phase converter (DC to AC converter) 75 converts the corrected d- and q-as target voltages Vd' and Vq' into three-phase target voltages Vu*, Vv* and Vw* through a conversion process and delivers the three phase target voltages Vu*, Vv* and Vw* to a motor driving section or driver 76.

The motor driver 76 includes a PWM (pulse-width modulated) voltage generator (predrive circuit) and an inverter circuit neither shown in FIG. 5). The PWM voltage generator generates PWM control voltage signals (gate drive signals) UU, VU and WU corresponding to the three-phase target voltages Vu*, Vv* and Vw*, respectively, and outputs the PWM control voltage signals UU, VU and WU to the inverter circuit. The inverter circuit generates three-phase alternating drive currents Iu, Iv and WU corresponding to the PWM control voltage signals UU, VU and WU, respectively. The three phase alternating drive seats Iu, Iv and Iw are supplied through a power line 77 to the brushless motor 19. The motor currents Iu, Iv and Iw are sinusoidal currents that are used for PWM-driving of the brushless motor 19

The power line 77 to the brushless motor 19 has three wires, two of Oh are equipped with the motor current detectors 78, 79. The motor current detectors 78, 79 detect two motor currents Iu and Iw out of the three motor currents Iu, Iv and Iw of different phases and output the detected motor currents Iu and Iw to a three-phase dq converting section or converter (AD to DC converter) 80. The three phase dq converter 80 calculates a motor current Iv of the remaining phase on the basis of the detected motor currents Iu, Iw. The three-phase dq converter 80 converts the motor currents Iu, Iv and Iw of three-phase alternating currents into d- and q-axis DC detection currents Id and Iq of two different phases.

An RD resolver-digital) converting section or converter 81 is continuously supplied with a signal from the resolver 23. The RD converter 81 calculates an angle rotational angle) θ of the rotor relative to the stator of the brushless motor 19 and delivers a signal corresponding to the calculated angle θ to the dq three phase converter 75 and the three-phase dq converter 80. The RD converter 81 also calculates an angular velocity (a of the rotor relative to the stator of the brushless motor 19 and supplies a signal representing the calculated angular velocity ω to the damper compensator 65, differentiator 81*d* and non-interference controller 7. The resolver 23 and the RD converter 81 together form a motor rotational angle detecting section or detector 23A.

As shown in FIG. 5, the motor controller 60 is essentially formed by a microcomputer 99 and respective functions of the circuit elements 63–65, 68–75, 80 and 81*d* are accomplished when corresponding operations defined in a computer program are performed by the microcomputer 99.

Figure 6:
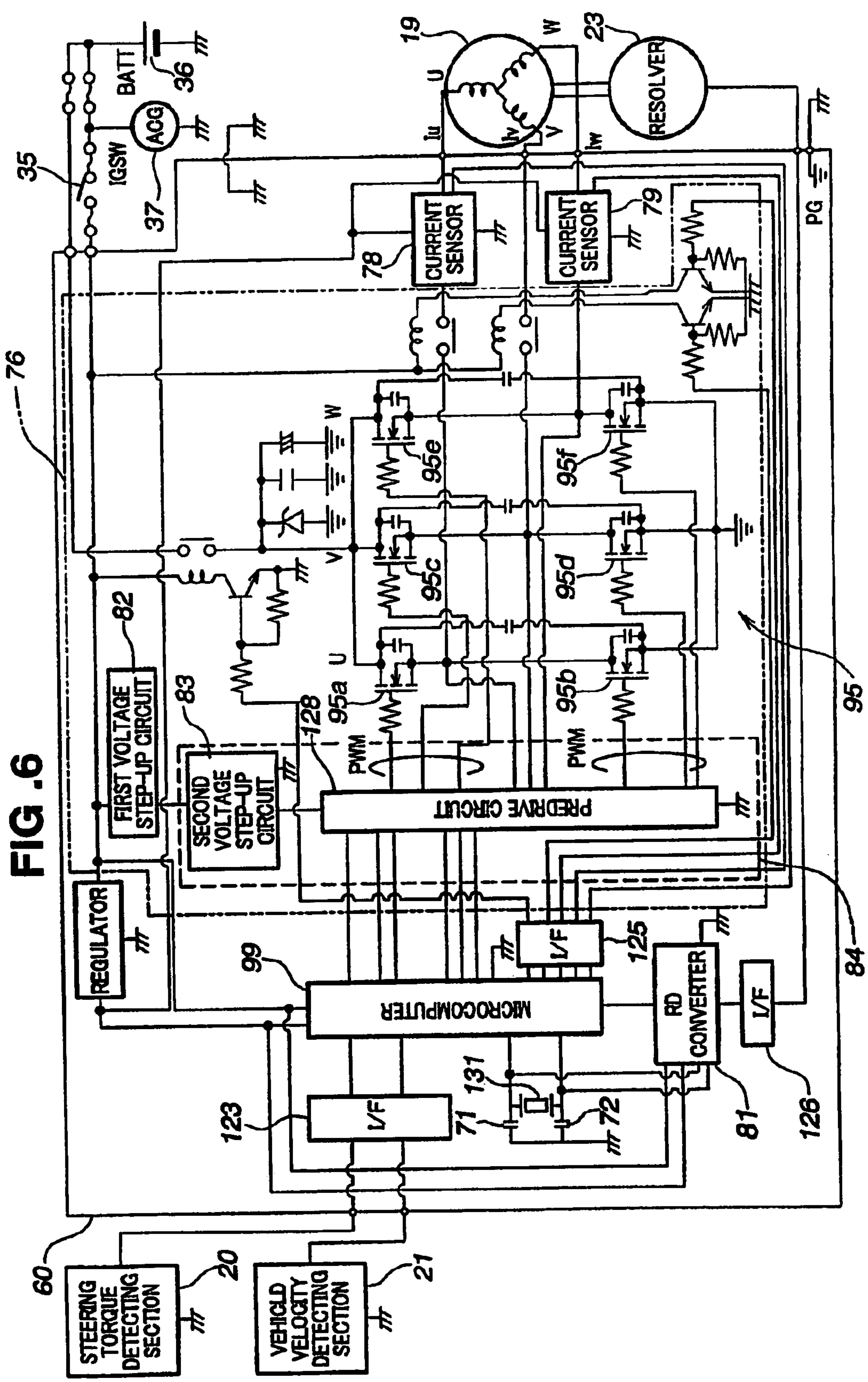
FIG. 6 is a circuit diagram showing a detailed structure of a motor drive circuit of the motor controller according to a first embodiment of the present invention.

FIG. 6 is a circuit diagram showing the structure of a motor drive circuit, which is incorporated in the motor controller of FIG. 4 according to a first embodiment of the present invention.

Figure 9:
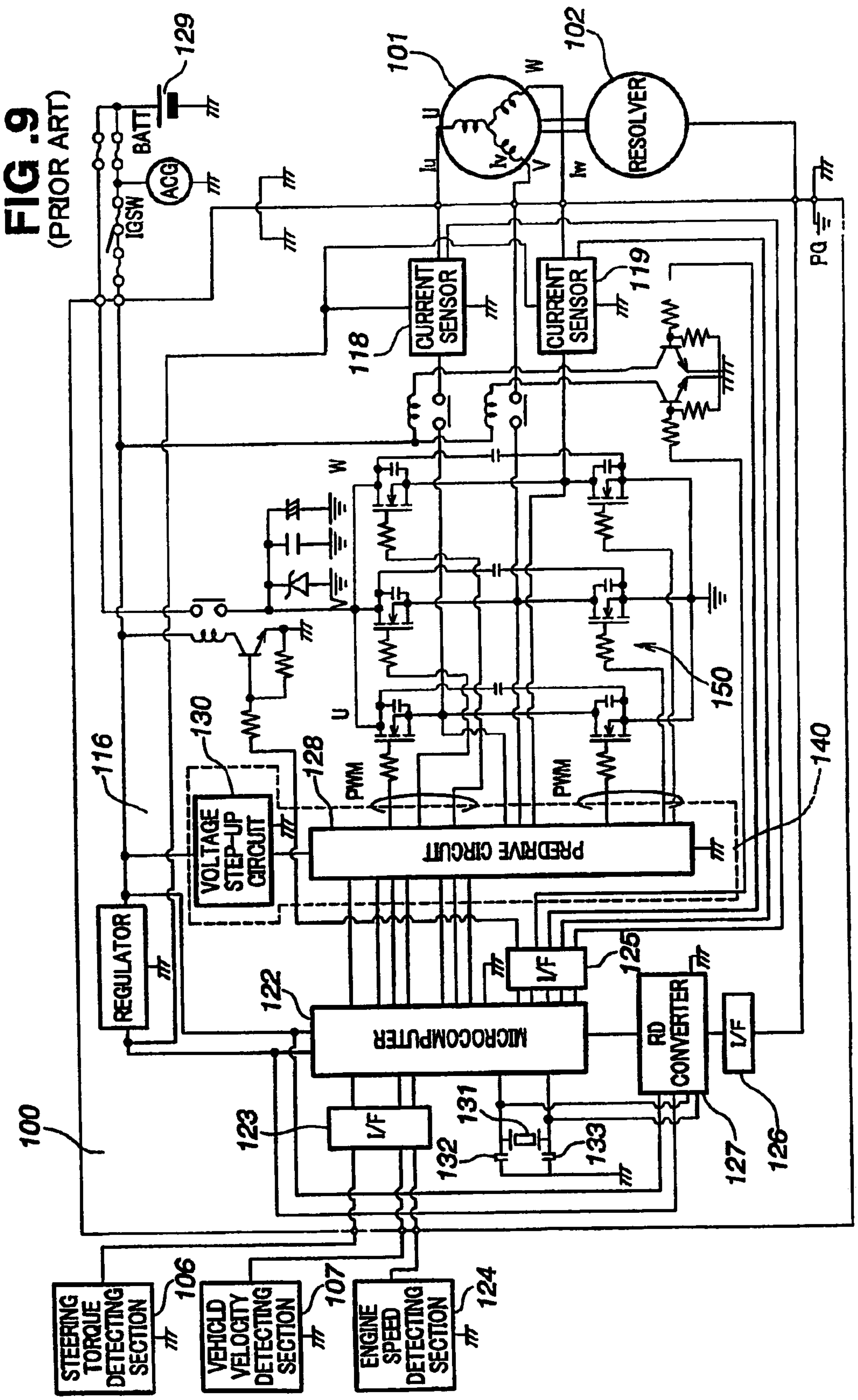
FIG. 9 is a circuit diagram showing a detailed structure of a motor controller of a conventional electric power steering apparatus.
Figure 10:
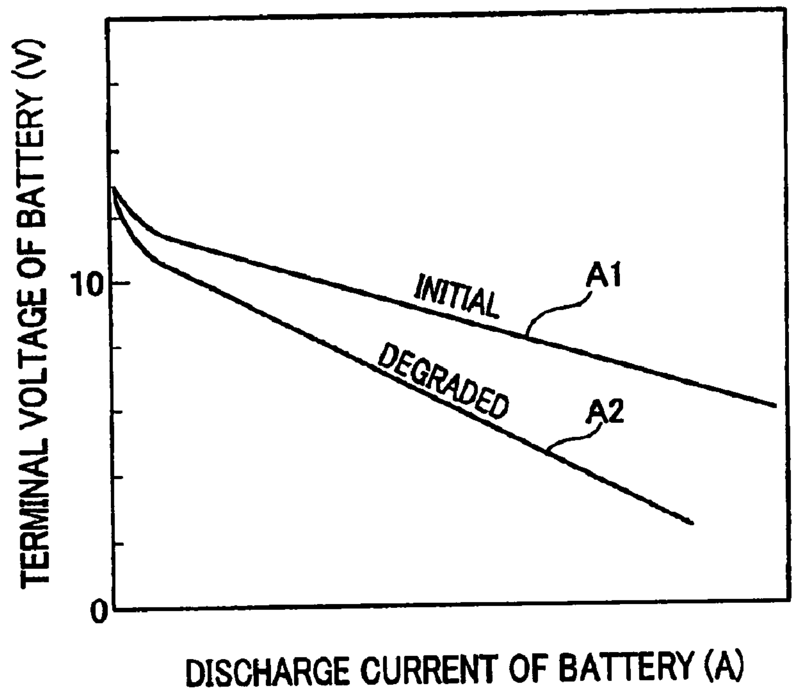
FIG. 10 is a graph showing the relationship between the terminal voltage of a battery and the discharge current of the battery.
Figure 11:
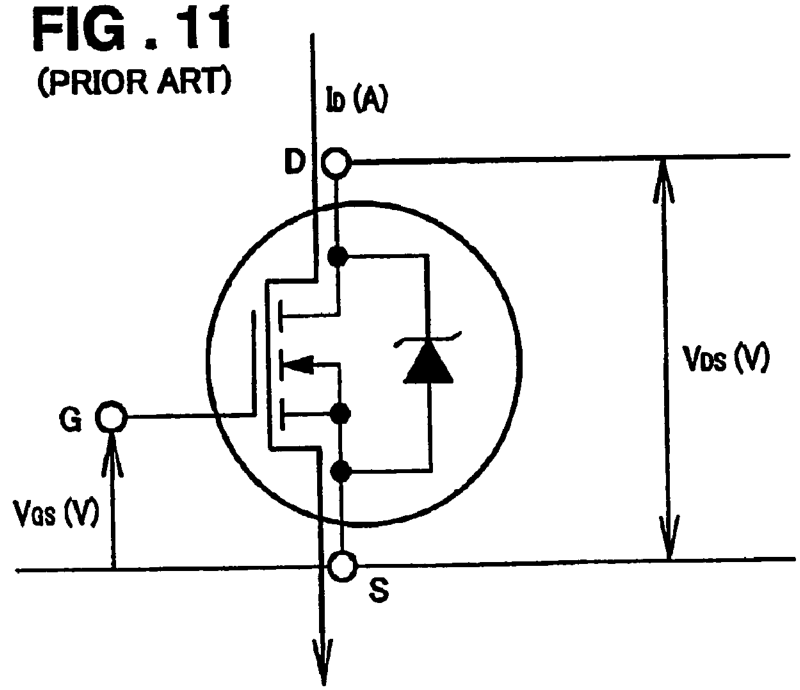
FIG. 11 is a circuit diagram showing the structure of an FET used in a bridge circuit.

As shown in FIG. 6, the motor drive circuit 76 generally comprises a bridge circuit 95 formed by a network of plural four in the illustrated embodiment) active elements (FETs) 96A, 95B, 95C, 95D, 95E and 95F, a predrive circuit 128 for driving or otherwise switching the FETs 95A–95F, a first voltage step-up circuit 82 for stepping up a voltage Line voltage) of a power supply 129, and a second voltage step-up circuit 83 disposed between the first voltage step-up circuit 82 and the predrive circuit 128 for stepping up an output voltage of the first voltage step-up circuit 82. With the motor drive circuit 76 thus arranged, the predrive circuit 128 can drive Us at a positive potential (i.e., on a high potential side) with an output voltage from the second voltage step-up circuit 83 supplied to the predrive circuit 128. The predrive circuit 128 and one voltage step-up circuits 83 may be coupled together to form a predrive section 84 in the same manner as the motor drive circuit 116 in the conventional motor controller 100 shown in FIG. 9.

Other parts of the motor controller 60 shown in FIG. 6 are the same as those already described above with reference to FIG. 5 and further description thereof can be omitted.

Figure 7:
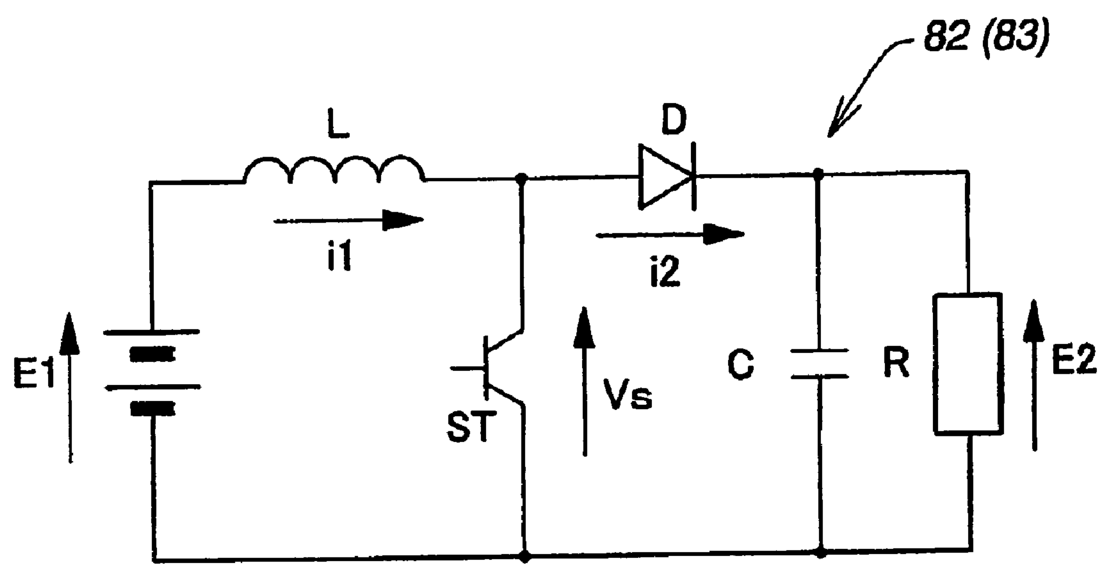
FIG. 7 is a circuit diagram exemplifying a voltage step-up circuit incorporated in the motor drive circuit.

FIG. 7 shows a circuit diagram of the first voltage step-up circuit 82. The second voltage step-up circuit 83 may have the same circuit configuration as the first voltage step-up circuit. The voltage step-up circuit 82 (83) includes a switching element or device ST, an inductance coil or inductor L, a diode D and a capacitor C that are connected as illustrated in FIG. 7. When ST is in the ON state, energy is stored in L When ST is turned off, the stored energy and energy from a power supply are supplied to a load R. If we assume that L has a sufficiently high value and the current flowing through L is constant, the energy stored in L during turn-on time $t_{ON}$ of ST is to be: $E_1 \times I_1 \times t_{ON}$. Then, assuming that C has a sufficiently high value and output voltage is constant, the energy discharged to L during turn-off time $t_{OFF}$ of ST is to be: $(E_2-E_1) \times I_1 \times t_{OFF}$. In a steady-state condition, $E_1 \times I_1 \times t_{ON}=(E_2-E_1) \times I_1 \times t_{OFF}$. We could then say that:

$$E_2=((t_{ON}+t_{OFF})/t_{OFF}) \times E_1=(T/t_{OFF}) \times E_1$$

In this equation, $T/t_{OFF}$ is greater than 1 and, hence, the output voltage is greater than the input voltage. We can thus step up the input voltage.

Operation of the motor drive circuit 76 will be described below. When the steering wheel 11 (FIG. 1) is turned, a steering torque is detected by the steering torque detecting section 20 and a steering torque signal T (FIG. 5) representing the detected steering torque is delivered to the controller 22 (FIG. 1). In the controller 22 (more properly the motor controller 60), the steering torque signal T, a vehicle velocity signal V from the vehicle velocity detecting section 21 and other control parameters are used to calculate a d-axis target current Id* and a q-axis target current Iq* for the motor 19.

On the other hand, based on phased current detection signals from the motor current detecting sections (current sensors) 78, 79 and a rotational angle signal from the resolver 23, a d-q conversion process is performed to calculate a d-axis current Id and a q-axis current Iq of the motor 19.

Then, the d- and q-axis currents Id and Iq of the motor 19 are compared with the d- and q-axis target currents Id* and Iq*, respectively. Respective deviations Did, Diq are subjected to a PI (proportional plus integral) compensation process and a dq/three-phase conversion process so as to calculate a PWM duty. Based on the PWM duty thus calculated, a PWM signal (gate drive signal) is supplied via the predrive section 84 (FIG. 6) to gates of the FETs so that sinusoidal motor currents of three different phases supplied to the stator windings 53 (FIG. 4) of the brushless motor 19 to thereby perform a vector control process on the brushless motor 19.

The FETs at a positive potential (or on a high potential side) of the bridge at 95 are driven via the second voltage step-up circuit 83 of the predrive section 84, and the line voltage from the power supply battery) 36 is supplied to via the first voltage step-up circuit 82 to the predrive section 84. In the illustrated embodiment, the circuit configuration (including switching operation of the switching device ST) of the first and second voltage step circuits 82, 83 previously described with reference to FIG. 7 are determined such that a desired voltage step ratio (output to input voltage ratio), such as 2:1 can be obtained Thus, given that the line voltage is 12V DC, the first voltage step-up circuit 82 steps up the 12V DC line voltage to 24V DC. The output voltage (24V DC) of the first voltage step-up circuit 82 is then supplied to the second voltage step-up circuit 83 where 24V DC is stepped up to 48V DC. 24V DC power is supplied to the predrive circuit 128.

Figure 12:
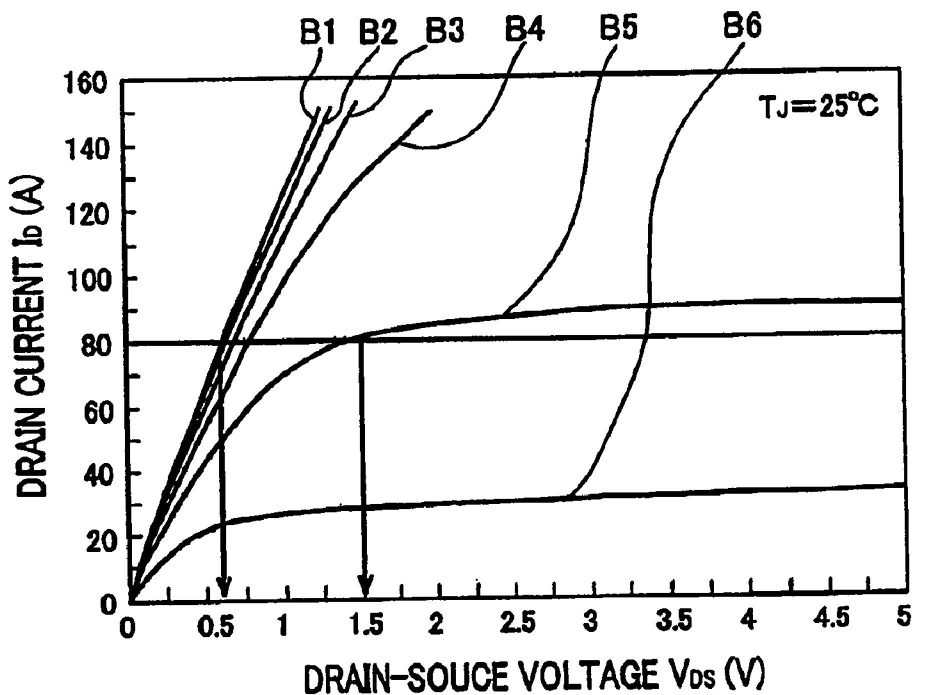
FIG. 12 is a graph showing the current versus voltage characteristics of the FET.
Figure 13:
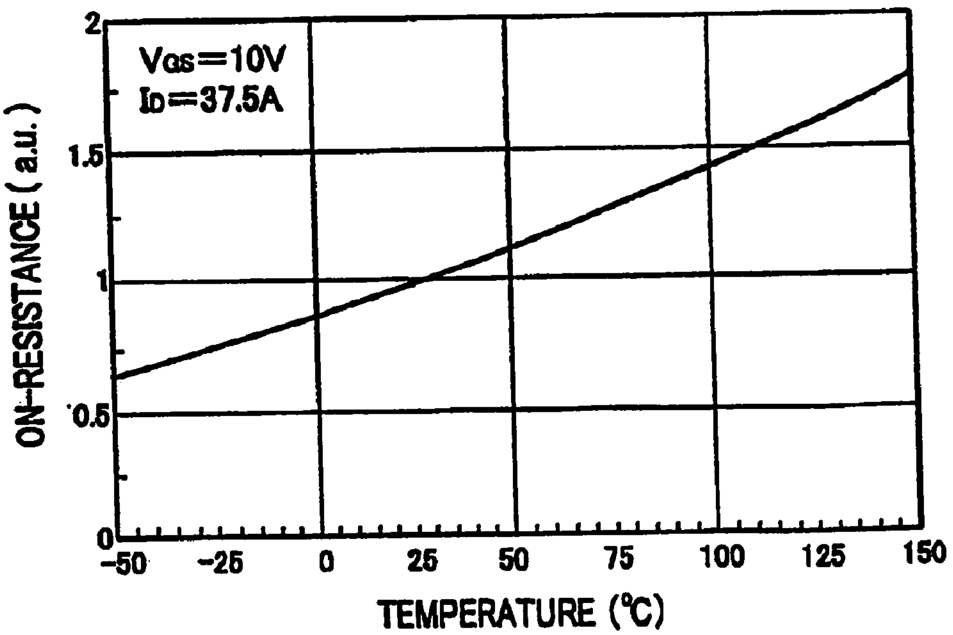
FIG. 13 is a graph showing the temperature-dependent characteristic of ON-resistance of the FET.

As previously discussed with reference to FIG. 12, the ON-resistance of FET decreases as the gate voltage $V_{GS}$ increases. Especially in a low gate voltage $V_{GS}$ region, a slight variation in gate voltage $V_{GS}$ induces a great increase in ON-resistance. Alternatively, in a high gate voltage $V_{GS}$ region, the ON-resistance is not so sensitive to the gate voltage variations. If we assume that only one voltage step-up circuit 82 or 83 is used as in the conventional motor drive circuit 116 shown in FIG. 9, 12V DC line voltage is stepped up to 24V DC before it is supplied to the predrive circuit 128. In this instance, if the line voltage drops from 12V to 8V, the output voltage from the voltage step-up circuit 82 or 83 will drop from 24V to 16V, causing the gate drive voltage from the predrive circuit to drop. Due to a drop in gate drive voltage, ON-resistance of the FETs becomes greater than a value achieved when the gate drive voltage is 24V. Given that a target current is obtained when the FETs are driven with 24V gate voltage at a given duty ratio, a gate drive voltage reduced below 16V due to a drop in the line voltage will require a greater duty ratio to achieve the target current against an increased ON-resistance of the FETs. Driving of the FETs at such higher duty ratio increases Joule heat produced in the FETs, raising the temperature of FETs. As previously discussed with reference to FIG. 13, with an increase in temperature of FETs, the ON-resistance of FETs increases to thereby allow less current to flow in FETs. This will lower the motor current. In this instance, however, since a drop in motor current is recovered by feedback control where the duty ratio is further increased, additional amount of Joule heat is produced in FETs and the ON-resistance of FETs further increases. The procedure will cause the motor output to fluctuate about a given value within a small range of variations.

On the other hand, in a region where the gate voltage $V_{GS}$ is relatively high, the ON-resistance varies insensitively with a variation in gate voltage $V_{GS}$. According to the invention, 12V DC line voltage is stepped up to 48V DC through a two-stage voltage step-up operation performed by the first and second voltage step-up circuits 82, 83. If the line voltage is lowered from 12V DC to 8V DC, the output voltage from the second voltage step-up circuit 83 drops from 48V DC to 32V DC. Since the predrive circuit 128 is supplied with 22V DC output voltage from the second voltage step-up circuit 83, a gate drive voltage supplied from the predrive circuit 128 is high enough to drive the FETs with an increase in ON-resistance that is considerably small as compared to the ON-resistance increase exhibited by the conventional arrangement shown in FIG. 9. Now considering that a target current is obtained by driving the FETs with a gate current of 48V DC at a given duty ratio, a voltage drop in the gate voltage from 48V DC to 32V DC caused due to a drop in 12V DC line voltage does not cause a substantial change or increase in ON-resistance, allowing the FETs to be driven at the same duty ratio as before the voltage drop occurs. In this instance, because no additional Joule heat is produced in the FETs and no further increase in temperature of the FETs takes place, the current flowing in the FETs remains unchanged. It is, therefore, possible to prevent fluctuations of the motor output from occurring.

It will be appreciated from the forgoing discussion that even when the line voltage of the motor vehicle drops abruptly due to degradation of the battery or when the motor of the electric power steering apparatus is driven while another in-vehicle device or unit is in motion, the voltage supplied via the series connected first and second voltage step-up circuits 82, 83 to the predrive circuit 128 is still sufficiently higher than the normal line voltage to the extent that the FETs are driven with a gate drive signal having a voltage high enough to drive the FETs without involving an objectionable increase in ON-resistance. This ensures that the motor output is free of fluctuations and a smooth steering feel can be obtained.

Figure 8:
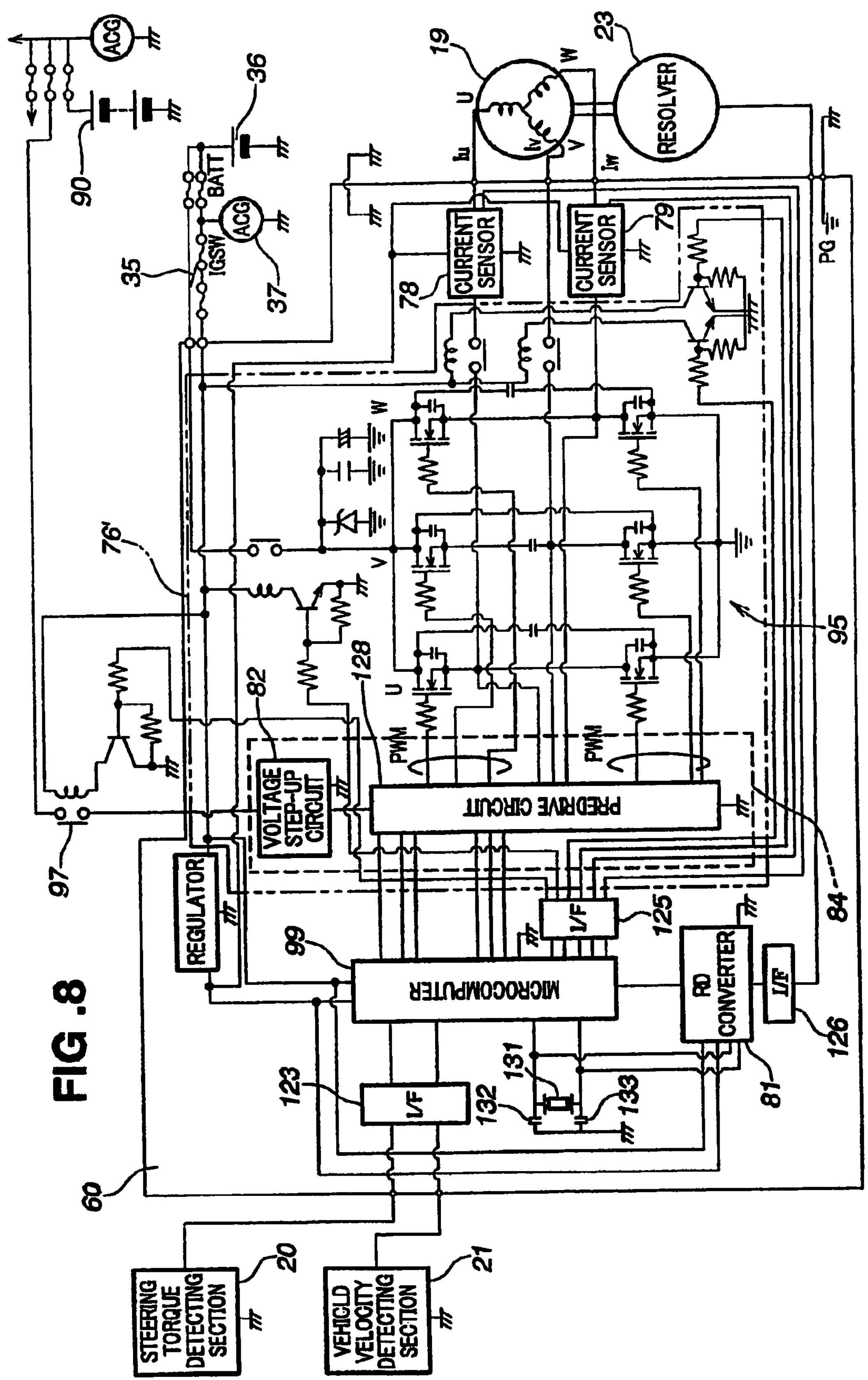
FIG. 8 is a view similar to FIG. 6, but showing a motor drive circuit according to a second embodiment of the present invention.

FIG. 8 shows the arrangement of a motor drive circuit according to a second embodiment of the present invention. The motor drive circuit 76 differs from the one 76 shown in FIG. 6 only in that a dingle voltage step-up circuit 82 is provided, and a second power supply 90 is provided separately from the line voltage source first power supply) 36 fox exclusive use with the predrive circuit 128 for supplying a voltage solely to the predrive circuit 128. The second power supply comprises a 24V DC battery and connected via the voltage step-up circuit 82 to the predrive circuit 128. A relay 97 is disposed between the second power supply 90 and the voltage step-up circuit 82 so as to block supply of power to the predrive circuit 128 when any sensor 20, 21, 23, 78, 79 or the microcomputer 99 is at fault.

The first power supply 36 comprises a 12V DC battery and supplies electric power to a bridge circuit 95. The voltage step-up circuit 82 steps up the voltage from the second power supply 90 from 24V DC to 48V DC before it is supplied to the predrive circuit 128. Thus, 48V DC is supplied to the predrive circuit 128.

Since the second power supply 90 is provided separately from the line voltage source (first power supply) 36, the voltage from the second power supply 90 is independent from line voltage variations which may occur when the first power supply or battery 36 undergoes deterioration or when the motor 19 of the electric power steering apparatus is driven while another in-vehicle device is in motion. Furthermore, since the second power supply 90 is provided for exclusive use with the predrive circuit 128, the voltage supplied to the predrive circuit 128 is stable in all times and does not cause variations in the gate drive signal. Accordingly, current flowing in the FETs does not vary so that the occurrence of objectionable fluctuations in motor output can be avoided As described above, by virtue of the second power supply 90 provided separately from the first power supply (line voltage source) 36 for exclusive use with the predrive circuit 128, the voltage supplied from the second power supply 90 to the predrive circuit 128 is independent from line voltage variations which may occur when the first power supply battery) 36 undergoes degradation or when the electric motor 19 of the electric power steering apparatus is driven while another in-vehicle device or unit is in motion. Thus, the gate drive signal has a voltage level, which is high and stable enough to drive the FETs (active elements) without involving an increase in ON-resistance of the FETs. Accordingly, output of the electric motor is free from fluctuations, and a smooth steering touch or feel can be obtained.

Although in the illustrated embodiment, the motor used for generating a steering assist torque comprises a brushless motor PWM-driven with sinusoidal currents through a vector control process, a motor equipped with brushes or a brushless motor driven through another drive control process may be employed.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus comprising:

a motor drive circuit for PWM-driving an electric motor to generate a steering assist torque corresponding to a steering torque, the motor drive circuit including:

a bridge circuit formed by a plurality of active elements connected together;

a first voltage step up circuit for stepping up a line voltage of the electric power steering apparatus;

a second voltage step-up circuit connected in series with the first voltage for stepping up an output voltage from the first voltage step-up circuit; and a predrive circuit connected in series with the bridge circuit and the second voltage step-up circuit for driving active elements at a positive potential of the active elements with an output voltage from the second voltage step-up circuit supplied to the predrive circuit.

2. An electric power steering apparatus comprising:

a motor drive circuit for PWM-driving an electric motor to generate a steering assist torque corresponding to a steering torque, the motor drive circuit including:

a bridge circuit formed by a plurality of active elements connected together;

a predrive circuit connected with the bridge circuit for driving active elements at a positive potential of the active elements;

a first power supply for supplying a first voltage to the bridge circuit; and a second power supply provided separately from the first power supply for exclusive use with the predrive circuit for supplying a second voltage solely to the predrive circuit.

3. An electric power steering apparatus according to claim 2, wherein the motor drive circuit further comprises a voltage step-up circuit disposed between the second power supply and the predrive circuit for stepping up the second voltage from the second power supply before the second voltage is supplied to the predrive circuit.

* * * * *